United States Patent
Wang et al.

(10) Patent No.: US 8,432,901 B2
(45) Date of Patent: Apr. 30, 2013

(54) CIRCUIT SERVICE TUNNELING METHODS AND USER EQUIPMENT THEREOF

(75) Inventors: Guotong Wang, Beijing (CN); Anthony Lee, San Diego, CA (US)

(73) Assignee: Via Telecom, Inc., San Diego, CA (US)

(*) Notice: Subject to any disclaimer, the term of this patent is extended or adjusted under 35 U.S.C. 154(b) by 356 days.

(21) Appl. No.: 12/775,535

(22) Filed: May 7, 2010

(65) Prior Publication Data

US 2010/0290437 A1 Nov. 18, 2010

Related U.S. Application Data

(60) Provisional application No. 61/177,660, filed on May 13, 2009, provisional application No. 61/187,281, filed on Jun. 16, 2009.

(51) Int. Cl.
*H04L 12/66* (2006.01)
(52) U.S. Cl.
USPC ........................................ 370/352; 370/395.2
(58) Field of Classification Search .................. 370/352, 370/353, 354, 355, 356, 357, 395.2
See application file for complete search history.

(56) References Cited

U.S. PATENT DOCUMENTS

| | | | | |
|---|---|---|---|---|
| 2009/0016300 A1* | 1/2009 | Ahmavaara et al. | .......... | 370/331 |
| 2009/0086674 A1* | 4/2009 | Ejzak | ............................ | 370/331 |
| 2010/0097990 A1* | 4/2010 | Hallenstal et al. | ............ | 370/328 |
| 2010/0135246 A1* | 6/2010 | Hallental | ....................... | 370/331 |
| 2010/0260105 A1* | 10/2010 | Keller et al. | ................... | 370/328 |
| 2010/0272064 A1* | 10/2010 | Chen | .............................. | 370/331 |
| 2010/0284333 A1* | 11/2010 | Shirota et al. | ................. | 370/328 |
| 2010/0290436 A1* | 11/2010 | Wang | ............................. | 370/335 |
| 2011/0013598 A1* | 1/2011 | Jang et al. | ..................... | 370/331 |
| 2011/0080867 A1* | 4/2011 | Mildh | ........................... | 370/328 |
| 2011/0200011 A1* | 8/2011 | Rune | ............................. | 370/331 |

FOREIGN PATENT DOCUMENTS

| CN | 101374335 | 2/2009 |
|---|---|---|
| CN | 101374336 | 2/2009 |

OTHER PUBLICATIONS

English language translation of abstract of CN 101374335 (published Feb. 25, 2009).
English language translation of abstract of CN 101374336 (published Feb. 25, 2009).

* cited by examiner

*Primary Examiner* — Kwang B Yao
*Assistant Examiner* — Nguyen Ngo
(74) *Attorney, Agent, or Firm* — McClure, Qualey & Rodack, LLP

(57) ABSTRACT

A user equipment is provided with connection to a first mobile service network providing circuit-switched services. A first protocol module communicates with the first mobile service network. A circuit-switch tunneling control protocol module establishes a circuit-service tunnel to a second mobile service network providing packet-switched services. A circuit-switch tunneling data protocol module transmits a circuit-service tunneling message from the first protocol module to the second mobile service network via the circuit-service tunnel.

20 Claims, 9 Drawing Sheets

CIRCUIT SERVICE TUNNELING METHODS AND USER EQUIPMENT THEREOF

CROSS REFERENCE TO RELATED APPLICATIONS

This Application claims the benefit of U.S. Provisional Application No. 61/177,660, filed on May 13, 2009, the entirety of which is incorporated by reference herein, and this Application also claims the benefit of U.S. Provisional Applications No. 61/187,281, filed on Jun. 16, 2009, the entirety of which is incorporated by reference herein.

BACKGROUND OF THE INVENTION

1. Field of the Invention

The invention generally relates to communications in the Circuit Switched Fall-Back (CSFB) architecture, and more particularly, to circuit service tunneling methods and user equipments thereof which conform to the CSFB architecture.

2. Description of the Related Art

With growing demand for mobile communications, the Global System for Mobile communications (GSM) supporting only circuit-switched (CS) domain services no longer meets user requirements. The mobile communications working groups and standard groups accordingly have developed the so-called third generation mobile communications technologies, such as Wideband Code Division Multiple Access (W-CDMA), Code Division Multiple Access-2000 (CDMA-2000), Time Division-Synchronous Code Division Multiple Access (TDSCDMA), etc. Take the Universal Mobile Telecommunications System (UMTS) using the W-CDMA technology for example. The 3rd Generation Partnership Project (3GPP) has further proposed the Long Term Evolution (LTE) system, also called the fourth generation mobile communications system, to be implemented to meet future demand for large wireless data transmission bandwidths. The LTE system aims to provide an all-IP architecture, in which only packet-switched (PS) domain instead of CS domain is used to carry all mobile communications services. Also, voice services are provided by Voice over Internet Protocol (VoIP) in the fourth generation mobile communications system, instead of the CS domain of the third generation mobile communications system.

However, during transition from the third generation mobile communications system to the fourth generation mobile communications system, some operators have still chosen to provide voice services via the CS domain of the third generation mobile communications system, due to the situation that the coverage rate and capacity of the CS domain of the third generation mobile communications system are already sufficient. A problem is raised for that the architecture of the third generation mobile communications system comprises both CS domain and PS domain while the fourth generation mobile communications system comprises only PS domain. Accordingly, the interconnection between the third generation mobile communications system and the fourth generation mobile communications system, especially the CS domain part, must be defined and specified, so that systems of different standards can smoothly interwork to provide voice services to users. One technique used is the Circuit Switched FallBack (CSFB) architecture, which is defined in the 3GPP TS 23.272 specification.

It is noted that, in the interconnection between the LTE system and the CDMA-2000 system, the 1x Link Access Control (1x LAC) layer of the CDMA-2000 protocol stack processes logical channels with a specific mapping relationship between the channels. Consequently, the 1x LAC layer in the CDMA-2000 system does not provide logical channel indication information and the CDMA-2000 system does not provide information of the logical channel used for transmitting signaling messages of the 1x LAC layer. In the current CSFB architecture, upon receiving a signaling message of the 1x LAC layer from the CDMA-2000 system, the 1x LAC layer in the LTE system can not obtain correct logical channel information to process the signaling messages of the 1x LAC layer. In addition, the 1x 2nd layers in the current CSFB architecture do not have an acknowledgement mechanism to ensure the delivery of some signaling messages of the 1x LAC layer, e.g. the registration messages. Thus, a method is needed to correctly interconnect the LTE system and the CDMA-2000 system operating in the CSFB architecture.

BRIEF SUMMARY OF THE INVENTION

Accordingly, embodiments of the invention provide circuit service tunneling methods and user equipments thereof. In one aspect of the invention, a user equipment connecting to a first mobile service network providing packet-switched (PS) domain services is provided. The wireless mobile communications device comprises a first communications protocol module, a circuit switch tunneling control module, and a circuit switch tunneling data module. The first communications protocol module communicates with the first mobile service network. The circuit switch tunneling control module establishes a circuit service tunnel between the first mobile service network and a second mobile service network providing circuit-switched (CS) domain services. The circuit switch tunneling data module transmits a circuit service tunneling message from the first communications protocol module to the second mobile service network via the circuit service tunnel.

In another aspect of the invention, a circuit service tunneling method for a user equipment connected to a first mobile service network providing packet-switched (PS) domain services is provided. The circuit service tunneling method comprises: communicating with the first mobile service network via a first communications protocol module; establishing a circuit service tunnel between the first mobile service network and a second mobile service network providing circuit-switched (CS) domain services; and transmitting a circuit service tunneling message from the first communications protocol module to the second mobile service network via the circuit service tunnel.

Other aspects and features of the invention will become apparent to those with ordinarily skill in the art upon review of the following descriptions of specific embodiments of the circuit service tunneling methods and the user equipments which conform to the CSFB architecture.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
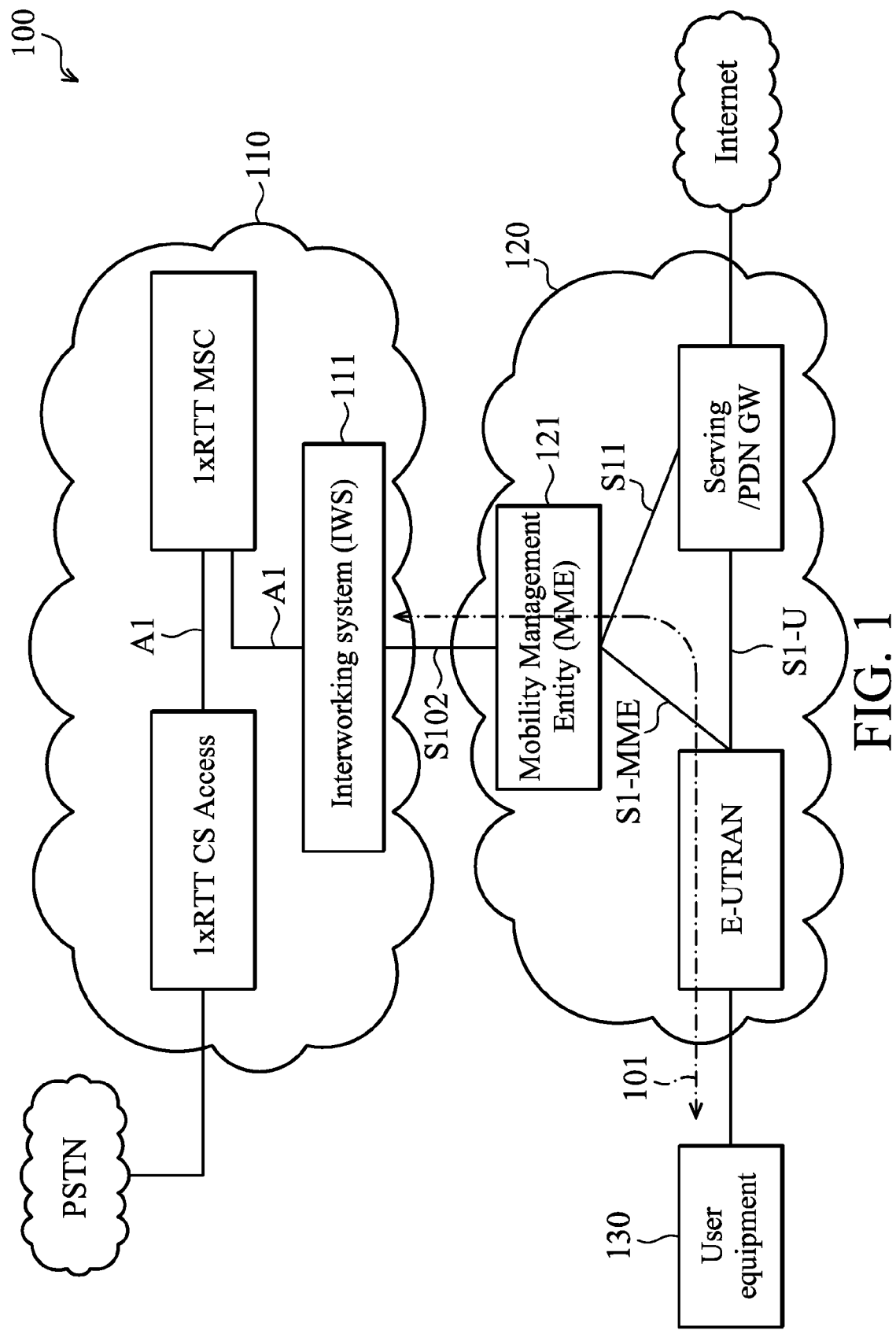
FIG. 1 is a block diagram illustrating a system operating in the CSFB architecture according to an embodiment of the invention.

The invention provides a method to correctly interconnect an LTE system and a CDMA-2000 system operating in the CSFB architecture. FIG. 1 is a block diagram illustrating a system operating in the CSFB architecture according to an embodiment of the invention. In a circuit service tunneling system 100, a third generation mobile communications system, a CDMA-2000 system 110, coexists with a fourth generation mobile communications system, an LTE system 120. A user equipment (UE) 130 supports not only the technology of the LTE system 120, but also the CS domain part of the CDMA-2000 technology. Although the area where the UE 130 is located under the coverage of both the LTE system 120 and the CDMA-2000 system 110, the UE 130 would choose to camp on the LTE system 120 as a first priority to obtain PS services as the LTE system 120 provides a larger data rate. As shown in FIG. 1, the CDMA-2000 system 110 and the LTE system 120 is interconnected via the interface S102 between the InterWorking System (IWS) 111 and the Mobility Management Entity (MME) 121. The description relating to the interface S102 is defined in the 3GPP TS 29.277 specification and is omitted in this specification as it is beyond the scope of the invention.

Distinct from the conventional UE and IWS, the CDMA 2000 protocol used in the UE 130 and IWS 111 of this invention further includes a Circuit Service Tunneling Protocol (CSTP) layer in the CDMA-2000 protocol stack. When a voice service is requested, the UE 130 establishes a communication tunnel 101 between itself and the IWS 111 in the CDMA-2000 system 110, to interconnect the LTE system 120 and the CDMA-2000 system 110. Therefore, the LTE system 120 provides the voice service to the UE 130 via the CS domain of the CDMA-2000 system 110. The UE 130 may be a mobile telephone (also known as cellular or cell phone), a laptop computer with wireless communications capability, or a personal digital assistant (PDA), etc. In addition, the UE 130 may be portable, handheld, pocket-sized, or installed in a vehicle, and may communicate voice and/or data signals with mobile communication networks.

Figure 2:
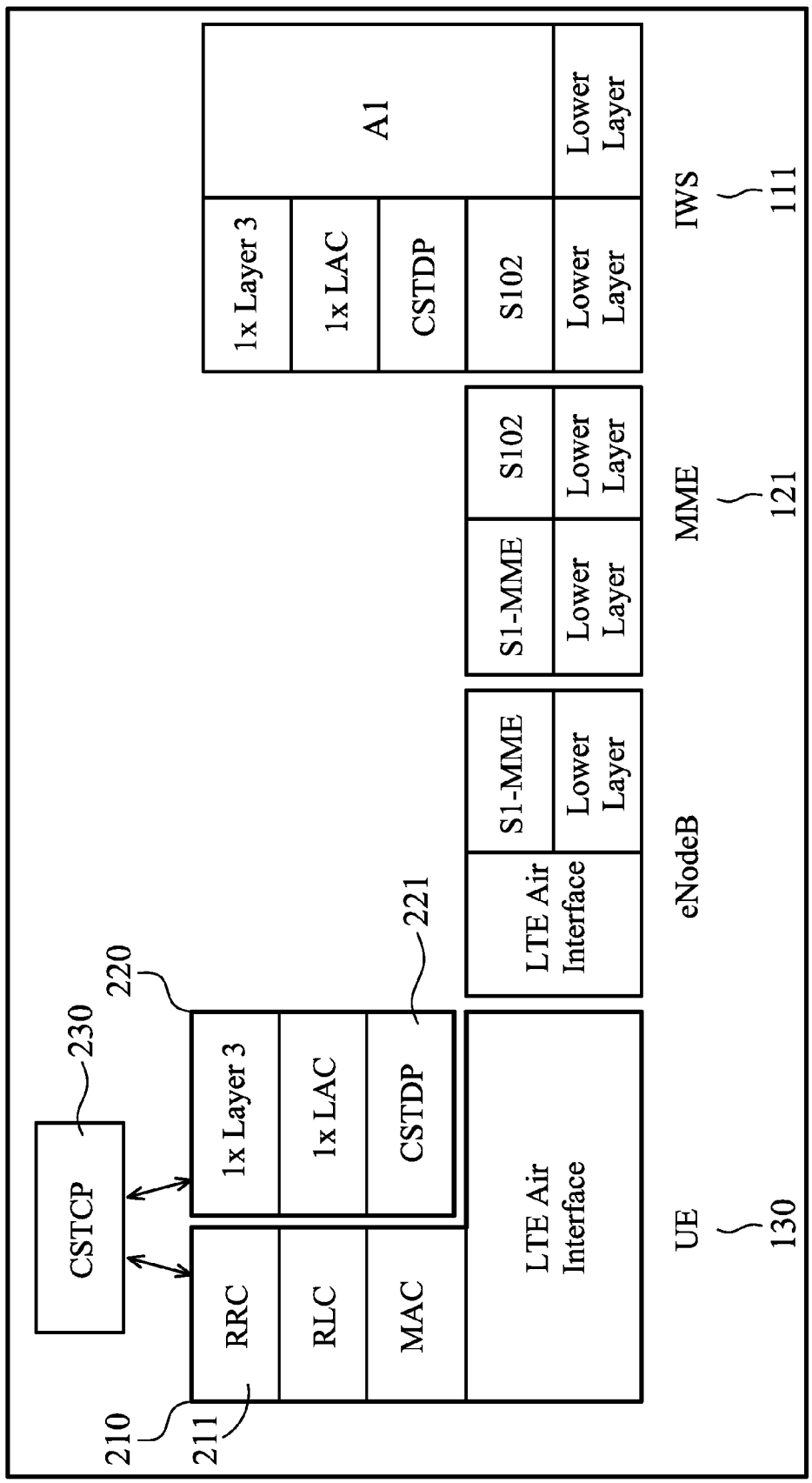
FIG. 2 is a block diagram illustrating the communication protocols operating in the CSFB architecture according to an embodiment of this present invention.

FIG. 2 is a block diagram illustrating the communication protocols in the CSFB architecture according to an embodiment of this present invention. The UE 130 mainly supports the LTE protocol stack 210, including the Radio Resource Control (RRC) layer 221, the Radio Link Control (RLC) layer, the Medium Access Control (MAC) layer, and the LTE Air Interface. In addition to the LTE protocol stack 210, the UE 130 also includes the CDMA-2000 CS-domain protocol stack 220, including the 1x Link Access Control (1x LAC) layer, the 1x Layer 3, and others. The Circuit Service Tunneling Protocol (CSTP) of the invention is divided into a Circuit Service Tunneling Data Protocol (CSTDP) layer 221 for a data plane, and a Circuit Service Tunneling Control Protocol (CSTCP) layer 230 for a control plane. The CSTDP layer 221 is logically located underneath the 1x Link Access Control (1x LAC) layer of the CDMA-2000 CS-domain protocol stack 220, to transmit/receive the 1x LAC encapsulated packet data unit (PDU) carrying the voice data via a communication tunnel 101. The CSTCP layer 230 is logically located between the LTE protocol stack 210 and the CDMA-2000 CS-domain protocol stack 220 for communications therebetween. The CSTCP layer 230, in this embodiment, is separated from the CDMA-2000 CS-domain protocol stack 220, while in other embodiments, the CSTCP layer 230 may be incorporated into the CDMA-2000 CS-domain protocol stack 220. For example, the CSTCP layer 230 may be incorporated into a 1x Non-Access-Stratum (1x NAS) layer (not shown) of the CDMA-2000 CS-domain protocol stack 220.

Correspondingly, in the protocol stack of the IWS 111, a CSTDP layer is logically located between the 1x LAC layer and the interface S102. However, a CSTCP layer is not required in the protocol stack of the IWS 111 because the IWS 111 only needs to support CDMA-2000 technology. Due to the addition of the CSTDP layer, appropriate modifications to the layers that couple with the CSTDP layer, such as the 1x LAC layer and the interface S102, are required. Moreover, appropriate modifications are also required for the 1x LAC layer of the UE 130 and the interface S102 of the MME 121. The LTE protocol stack 210 may include other protocol layers, such as a Non-Access-Stratum (NAS) layer (not shown), a physical layer (not shown), etc. The CDMA-2000 CS-domain protocol stack 220 may include other protocol layers, such as a 1x NAS layer (not shown). For implementation, any protocol stack described herein may be realized by software, hardware, or any combination of both.

Figure 3:
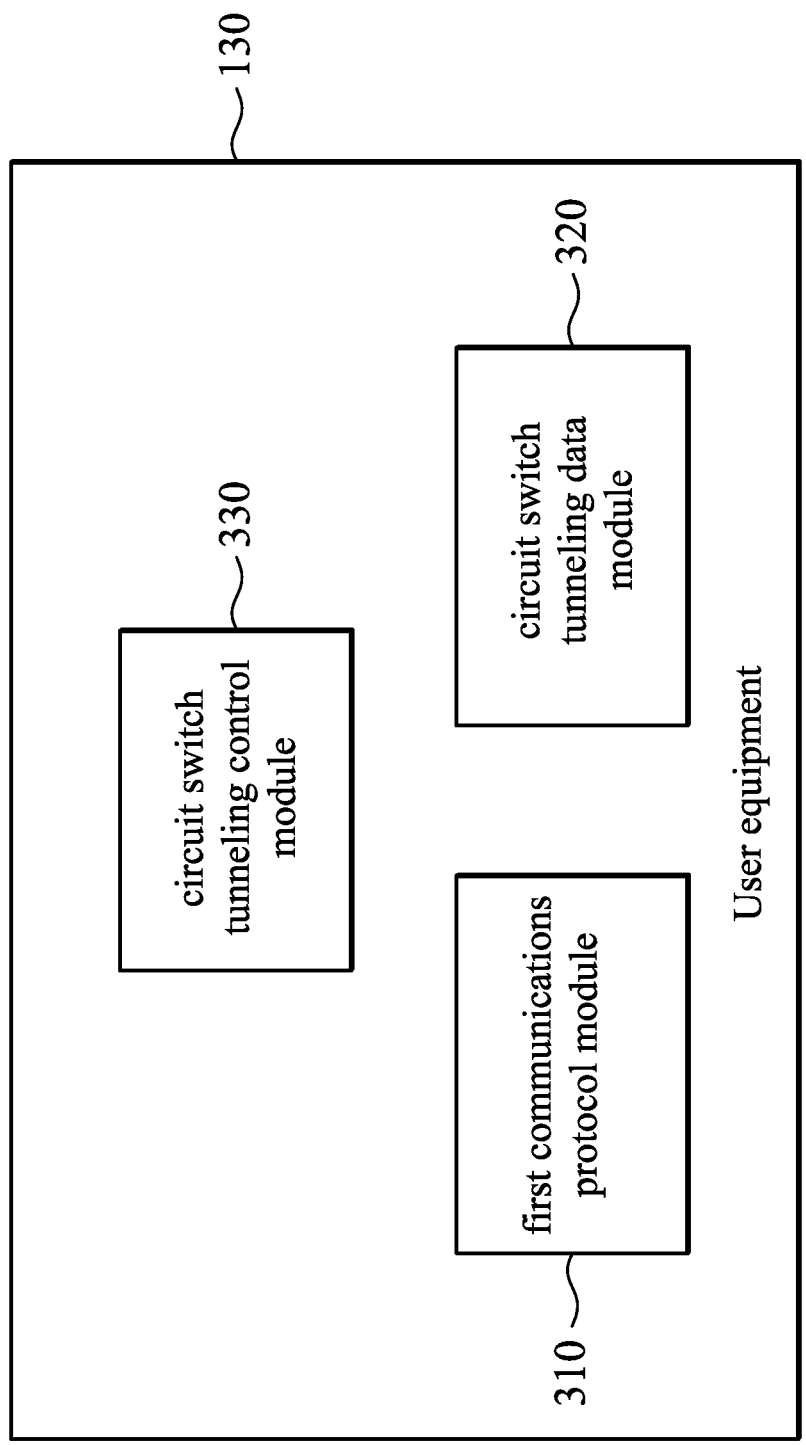
FIG. 3 is a block diagram illustrating a user equipment according to an embodiment of the invention.

FIG. 3 is a block diagram illustrating a user equipment according to an embodiment of the invention. The UE 130 includes a first communications protocol module 310, a circuit switch tunneling control module 320, and a circuit switch tunneling data module 330. The first communications protocol module 310 is configured to communicate with a first mobile service network according to a first communications protocol, wherein the first mobile service network provides PS domain services. The circuit switch tunneling control module 320 is configured to establish a circuit service tunnel between the first mobile service network and a second mobile service network providing CS domain services. The circuit switch tunneling data module 330 is configured to transmit a circuit service tunneling message to the second mobile service network via the circuit service tunnel. In one embodiment, the first mobile service network is the LTE system 120, the second mobile service network is the CDMA-2000 system 110, and the first communications protocol is the LTE protocol stack 210. In addition, the UE 130 may further include a second communications protocol module (not shown) for communicating with the second mobile service network according to a second communications protocol, e.g. the CDMA-2000 CS-domain protocol stack 220. The circuit switch tunneling control module 320 may be configured to execute procedures specified by the CSTCP layer 230. In other embodiments, the second mobile service network may be another mobile communications system, such as a Worldwide Interoperability for Microwave Access (WiMAX) system ' a Wireless Fidelity (WiFi) system ' High Rate Packet Data (HRPD) system, or a CDMA 1x Evolution-Data Optimized (EV-DO) system.

Figure 4:
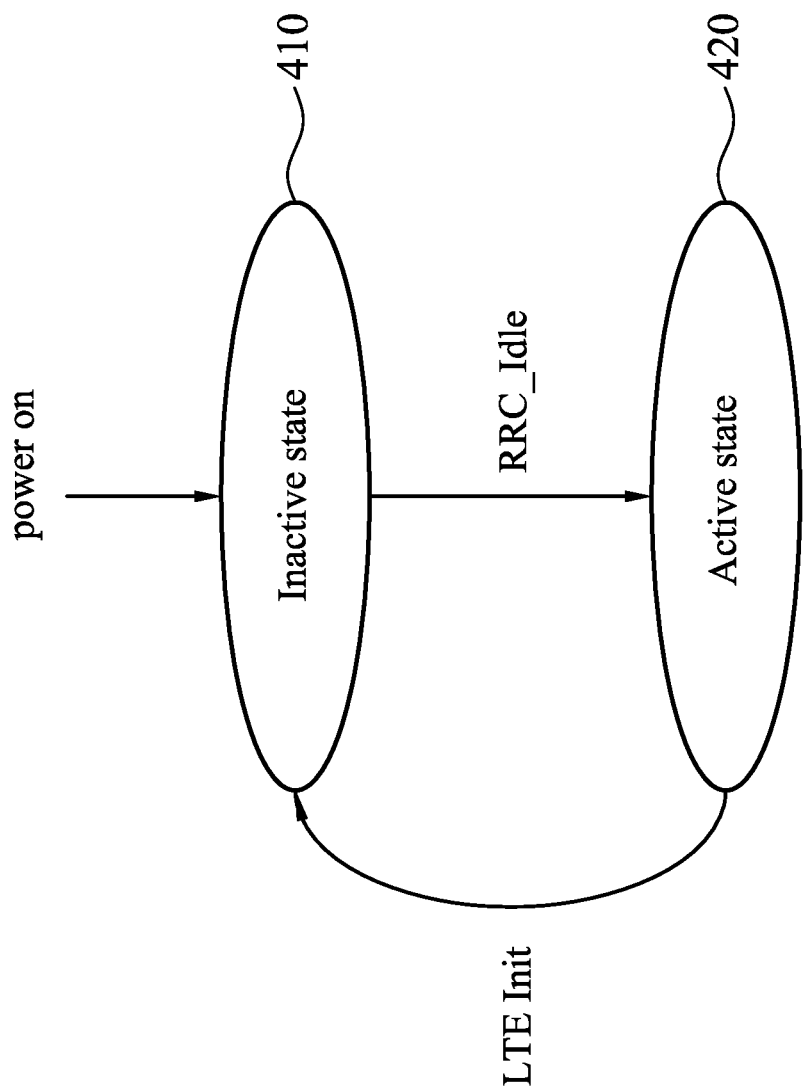
FIG. 4 is a state diagram illustrating state transitions of a CSTCP layer according to an embodiment of the invention.

FIG. 4 is a state diagram illustrating state transitions of a CSTCP layer according to an embodiment of the invention. In this embodiment, the CSTCP layer 230 is incorporated into a 1x NAS layer. Thus, the operational states of the CSTCP layer 230 and the 1NAS layer may be considered as being synchronous. When the UE 130 is powered on, the 1x NAS layer is woken up to enter an inactive state 410 to wait for further instructions. In other words, a circuit service tunnel is not yet established between the LTE system 120 and the CDMA-2000 system 110 when the 1x NAS layer is in the inactive state 410. Next, when the UE 130 is successfully connected to the LTE system 120, the RRC layer 211 In the UE 130 enters an RRC_Idle state and informs the 1x NAS layer that it has entered the RRC_Idle state. The 1x NAS layer enters an active state 420 upon receiving the information from the RRC layer 211. Meanwhile, the CSTCP layer 230 starts to interface between the LTE protocol stack 210 and the CDMA-2000 CS-domain protocol stack 220, to establish a circuit service tunnel between the LTE system 120 and the CDMA-2000 system 110. Thereafter, if the re-initialization of the LTE protocol stack 210 starts when the 1x NAS layer is in the active state 420, the 1x NAS layer would return from the active state 420 to the inactive state 410.

Figure 5:
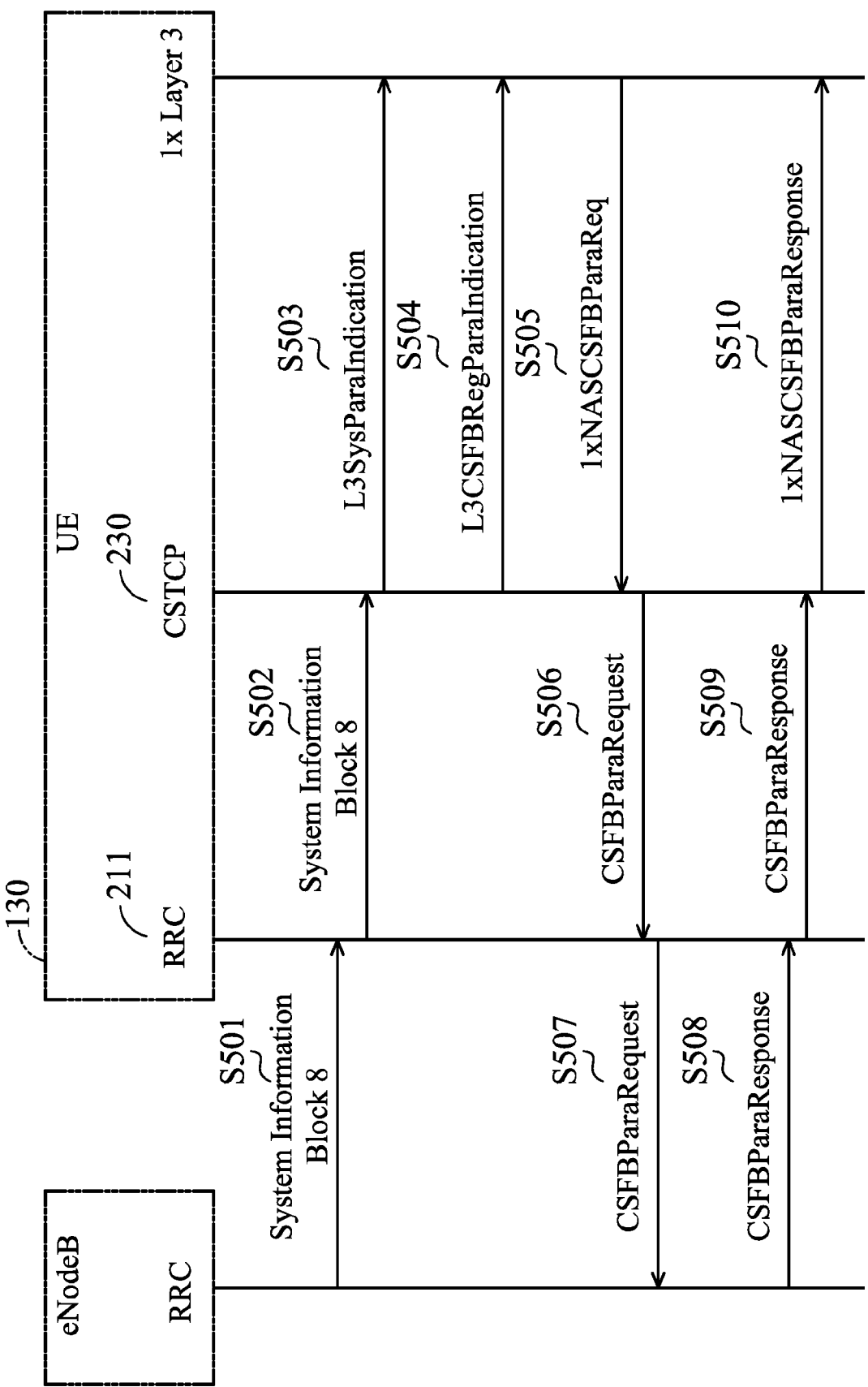
FIG. 5 is a message sequence chart illustrating a parameter request procedure of a Circuit Service Tunneling Protocol (CSTP) according to an embodiment of the invention.

FIG. 5 is a message sequence chart illustrating a parameter request procedure of a Circuit Service Tunneling Protocol (CSTP) according to an embodiment of the invention. As described above, when the UE 130 is powered on and successfully connected to the LTE system 120, the RRC layer 211 in the second communications protocol module enters the RRC_Idle state. In the RRC_Idle state, the RRC layer 211 receives a System information Block 8 (SIB-8) from an evolved-NodeB (eNodeB) (step S501). The RRC layer 211 further transfers the SIB-8 to the CSTCP layer 230 in the circuit switch tunneling control module 330 (step S502). It is noted that the eNodeB, though not shown, is located in the LTE system 120 according to FIG. 1. The SIB-8 includes system time information, long code state information, and CSFB registration parameters. The CSTCP layer 230 transfers the system time information and the long code state information in an L3SysParaIndication to the 1x Layer 3 (step S503), and transfers the CSFB registration parameters in an L3CSFBRegParaIndication to the 1x Layer 3 (step S504). In order to obtain CSFB configuration parameters to establish a circuit service tunnel, the 1x Layer 3 sends a 1xNASCSFBParaReq to the CSTCP layer 230 upon receiving the L3CSFBRegParaIndication (step S505). The CSTCP layer 230 then sends a CSFBParaRequest to the RRC layer 211 (step S506). The CSFBParaRequest is further transmitted to the eNodeB by the RRC layer 211 (step S507). Subsequently, the eNodeB requests the CSFB configuration parameters from the CDMA-2000 system 110 according to the CSFBParaRequest (step not shown). After the CSFB configuration parameters is received from the CDMA-2000 system 110, the eNodeB transmits the CSFB configuration parameters in a CSFBParaResponse to the RRC layer 211 (step S508), and the CSFBParaResponse is further forwarded to the CSTCP layer 230 by the RRC layer 211 (step S509). At last, the CSTCP layer 230 transfers the CSFB configuration parameters in a 1xNASCSFBParaResponse to the 1x Layer 3 (step 8510) to establish the circuit service tunnel.

Figure 6:
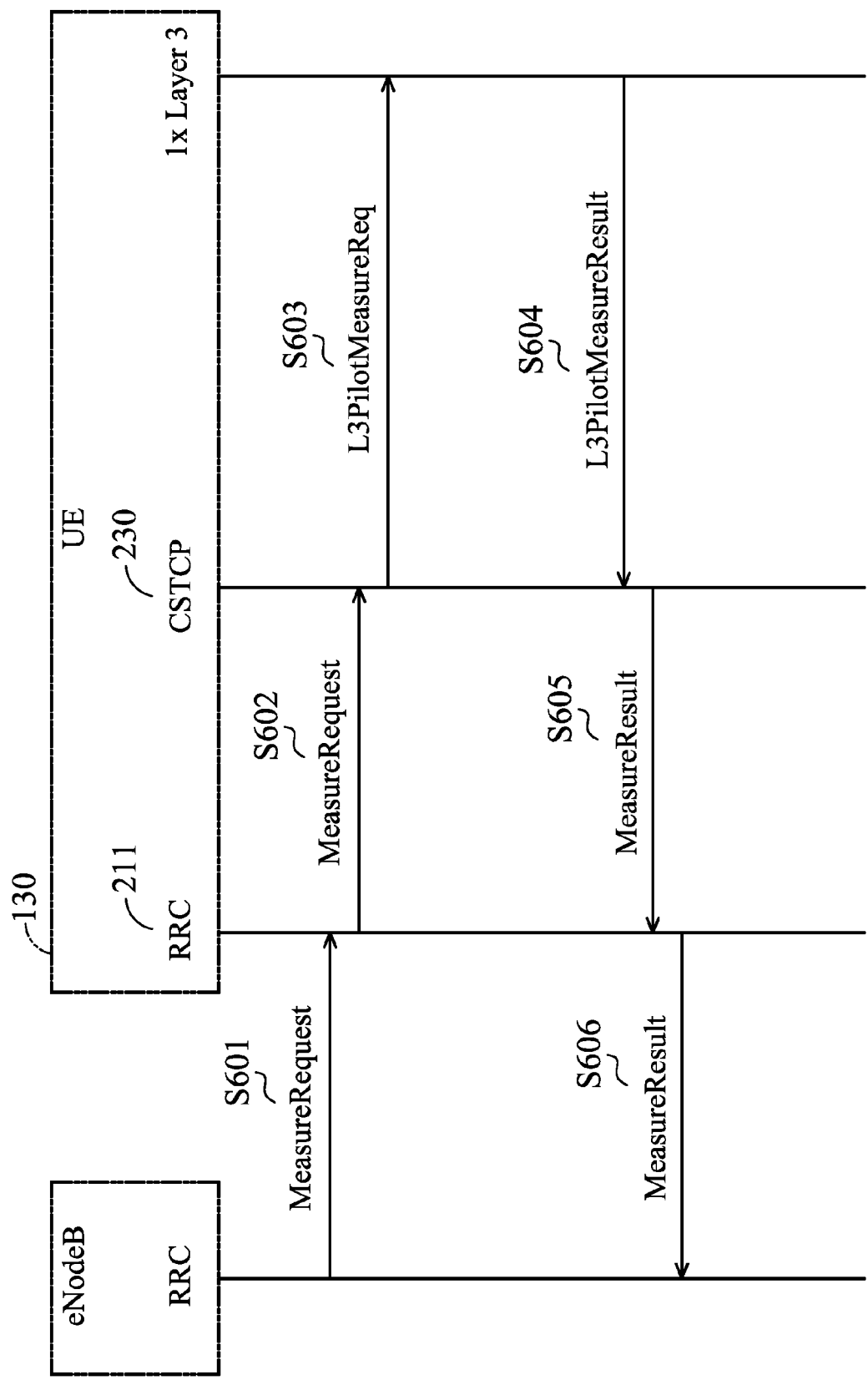
FIG. 6 is a message sequence chart illustrating a pilot measurement procedure of a Circuit Service Tunneling Protocol (CSTP) according to an embodiment of the invention.

FIG. 6 is a message sequence chart illustrating a pilot measurement procedure of a Circuit Service Tunneling Protocol (CSTP) according to an embodiment of the invention. To begin, when the UE 130 receives a MeasureRequest from the eNodeB (step S601), the RRC layer 211 transfers the MeasureRequest to the CSTCP layer 230 in the circuit switch tunneling data module 330 (step S602). The CSTCP layer 230 further transfers a L3PilotMeasureReq to the 1x Layer 3 (step S603). Upon receiving the L3PilotMeasureReq, the 1x Layer 3 request the lower layer (not shown) of the UE 130 to measure the pilot signals (step not shown). After the result of the measurement is obtained, the 1x Layer 3 transfers the measurement result in a L3PiiotMeasureResult to the CSTCP layer 230 (step S604). The CSTCP layer 230 transfers the measurement result in a MeasureResult to the RRC layer 211 (step S605), and the MeasureResult is further transmitted to the eNodeB by the RRC layer 211 (step S606), thus ending the pilot measurement procedure.

Figure 7:
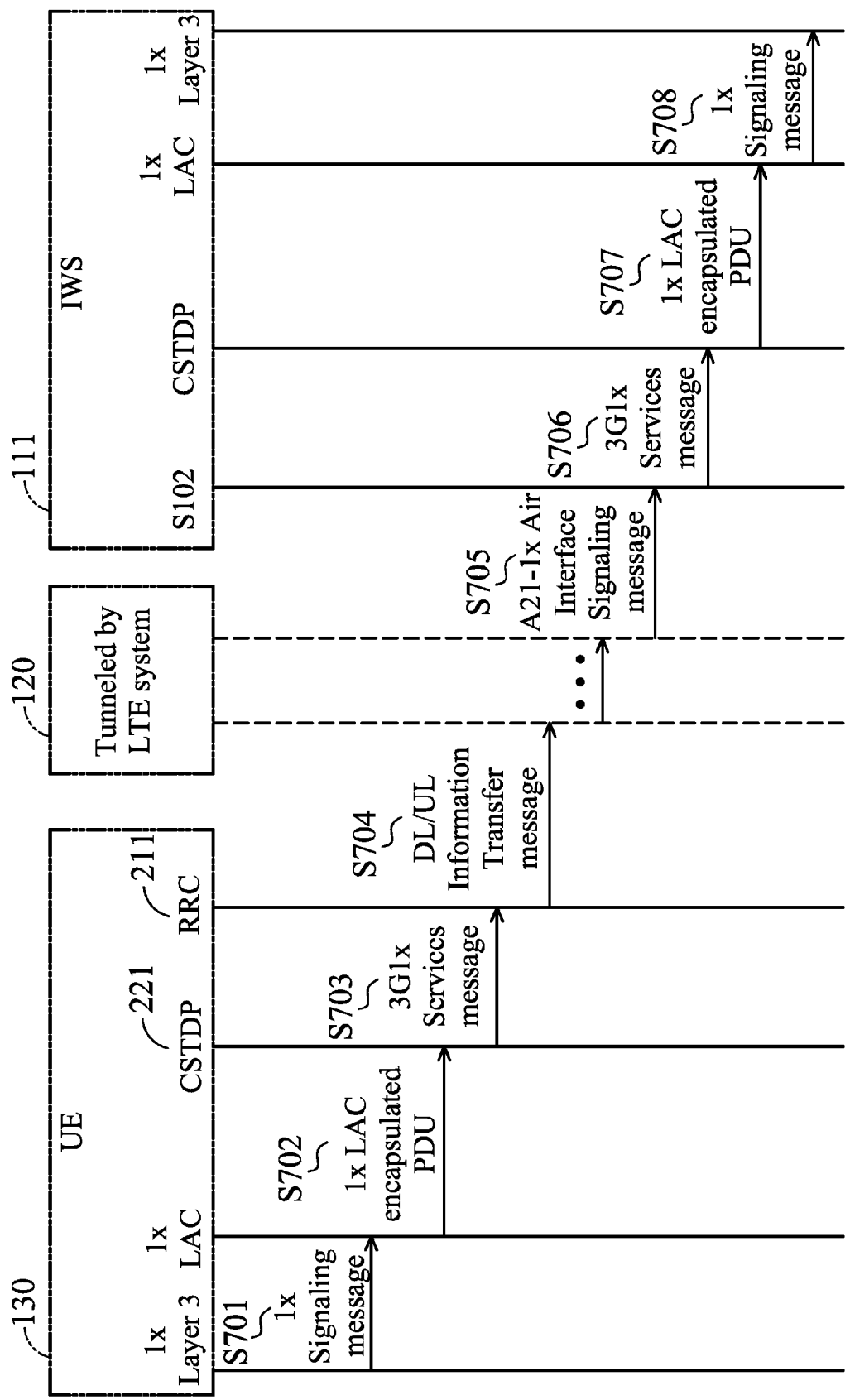
FIG. 7 is a message sequence chart illustrating a circuit server tunneling method in the CSFB architecture according to an embodiment of the invention.

FIG. 7 is a message sequence chart illustrating a circuit server tunneling method in the CSFB architecture according to an embodiment of the invention. When the UE 130 wishes to make a voice call, the 1x layer 3 in the first communications protocol module 310 transfers a 1x Signaling message to the 1x LAC layer (step S701). The 1x LAC layer then encapsulates the 1x Signaling message in a 1x LAC encapsulated PDU, and transfers the 1x LAC encapsulated PDU to the CSTDP layer 221 in the circuit switch tunneling control module 320 (step S702). The CSTDP layer 221 uses a 3G1xServices message to carry the 1x LAC encapsulated PDU and transfers the 3G1xServices message to the RRC layer 211 in the second communications protocol module (step S703). The RRC layer 221 packages the 3G1xServices message in a downlink/uplink (DL/UL) Information Transfer message and transmits the DL/UL Information Transfer message to the LTE system 120 via the LTE air interface (step S704). In the LTE system 120, the DL/UL Information Transfer message is processed by a series of entities, such as the MME 121, the Evolved Universal Terrestrial Radio Access Network (E-UTRAN), etc, to be transformed into an A21-1x Air Interface Signaling message, and the A21-1x Air Interface Signaling message is further transmitted to the interface S102 of the IWS 111 (step S705). Subsequently, the interface S102 retrieves the 3G1xServices message from the A21-1x Air Interface Signaling message, and transfers the 3G1xServices message to the CSTDP layer (step S706). The CSTDP layer then retrieves the 1x LAC encapsulated PDU from the 3G1xServices message, and further transfers the 1x LAC encapsulated PDU to the 1x LAC layer (step S707). At last, the 1x LAC layer decapsulates the 1x LAC encapsulated PDU to obtain the 1x Signaling message and transfers the 1x Signaling message to the 1x Layer 3 (step S708). As a result, the UE 130 successfully establishes a circuit service tunnel to the IWS 111, and obtains CS domain services via the IWS 111. In this embodiment, the 3G1xServices message is directly transferred from the CSTDP layer 221 to the RRC layer 211. In other embodiments, the CSTCP layer 230 may serve as an interface media between the CSTDP layer 221 and the RRC layer 211 to transfer the 3G1xServices message therebetween. Although FIG. 7 only depicts the message sequence from the UE 130 to the IWS 111, a message sequence from the IWS 111 to the UE 130 should readily suggests itself to those skilled in the art.

Figure 8:
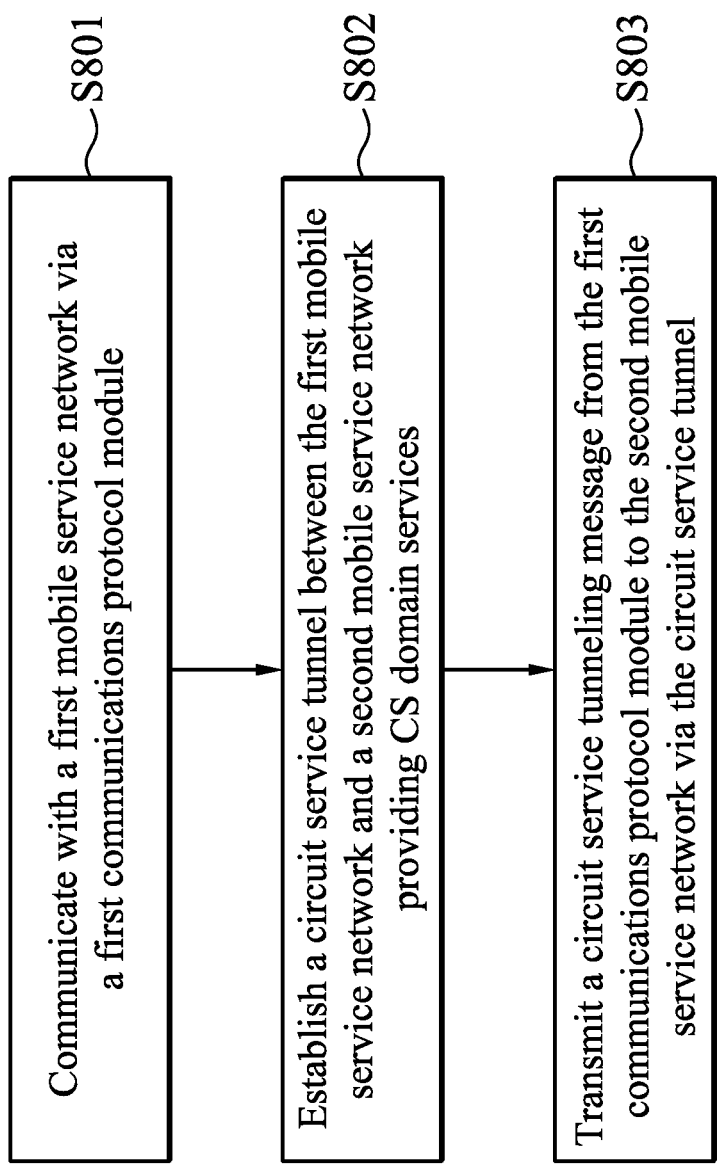
FIG. 8 is a flow chart illustrating a circuit service tunneling method for a user equipment according to an embodiment of the invention.

FIG. 8 is a flow chart illustrating a circuit service tunneling method for a user equipment according to an embodiment of the invention. To begin, the UE 130 connects to the LTE system 120 and communicates with the LTE system 120 via the LTE protocol stack 210 (step S801). When CS domain services from the CDMA-2000 system 110 is desired, the UE 130 establishes a circuit service tunnel to the CDMA-2000 system 110 (step S802). Next, the UE 130 encapsulates a 1x LAC encapsulated PDU, that is to be transmitted, in a circuit service tunneling message, i.e. a 3G1xServices message. The LTE protocol stack 210 of the UE 130 transmits the circuit service tunneling message to the CDMA-2000 system 110 via the circuit service tunnel (step S803). In this embodiment, the UE 130 and the IWS 111 both comprise the circuit service tunneling protocol (CSTP) of the invention, and perform encapsulation of transmitted messages and decapsulation of received messages to accomplish the concept of the establishment of a circuit service tunnel therebetween.

Figure 9:
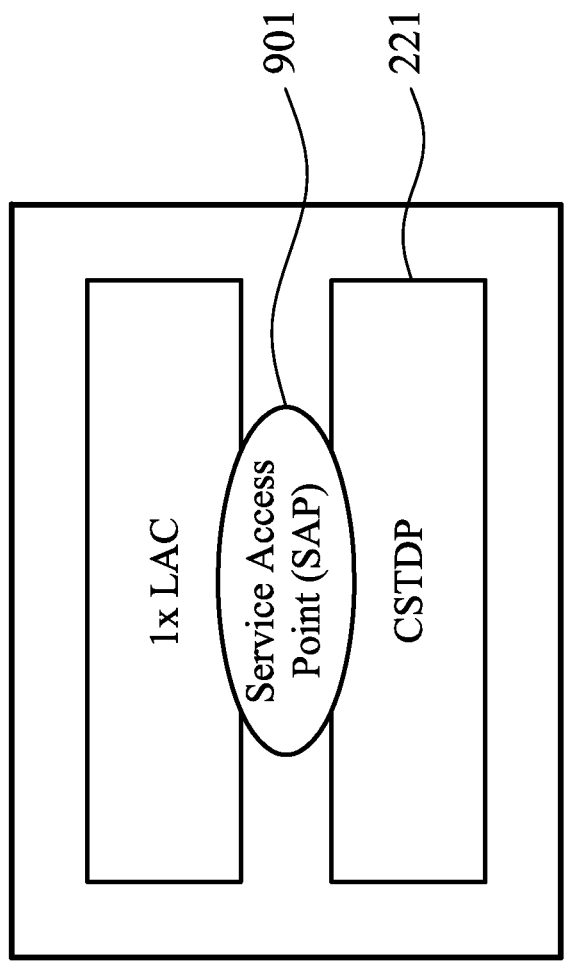
FIG. 9 is a block diagram illustrating a Service Access Point (SAP) between a CSTDP layer and a 1x LAC layer according to an embodiment of the invention.

For both the UE 130 and the IWS 111, a Service Access Point (SAP) 901 is provided, as shown in FIG. 9, for the communications between the CSTDP layer and the 1x LAC layer in response to the addition of the CSTDP layer. In the SAP 901, interface primitives, such as a CSTP-Data.Request, a CSTP-Data.Indication, a CSTP-SDUReady.Request, a CSTP-Availability.Indication, and CSTP-Failure.Indication, are defined to exchange the 1x LAC encapsulated PDU(s) and related interface control information between the CSTDP layer and the 1x LAC layer. The information of the interface primitives are listed in Table 1 as follows:

In addition to supporting the mentioned interface primitives, the 1x LAC layer of the invention also modifies its utility sublayer by deleting the "Radio Environment Report" field, and further modifies the Segmentation and Reassembly (SAR) sublayer according to the mentioned interface primitives to provide corresponding operations. When in a transmission mode, the SAR sublayer uses a CSTP-SDUReady.Request to indicate that there is a 1x LAC encapsulated PDU ready for transmission. The CSTP layer determines whether to use a CSTP-Availability.Indication according to the parameters in the CSTP-SDUReady.Request. The SAR sublayer waits to use a CSTP-Data.Request to transfer the 1x LAC encapsulated PDU to the CSTP layer until a CSTP-Availability.Indication is received. Then, the CSTP layer transfers the 1x LAC encapsulated PDU to the interface S102 via a 3G1xServices message. The message format of the 3G1xServices message is defined in Table 2 as shown below. When in a reception mode, the SAR sublayer receives the 1x LAC encapsulated PDU from the CSTP layer via a CSTP-Data.Indication, and processes the 1x LAC encapsulated PDU according to the logical channel information indicated in the CSTP-Data.Indication. Regarding the process of the 1x LAC encapsulated PDU, reference may be made to the 3GPP2 C.S0004 specification—"Signaling Link Access Control (LAC) Standard for cdma2000 Spread Spectrum Systems".

TABLE 1

| | CSTP-Data.Request | |
|---|---|---|
| Type | Request | |
| Direction | From the 1x LAC layer to the CSTP layer | |
| Action | To deliver the 1x LAC encapsulated PDU(s) to the CSTP layer | |
| Parameters | logical_channel | The logical channel type, e.g. a dedicated signaling channel (dsch) or a shared signaling channel (csch) |
| | data | The 1x LAC encapsulated PDU(s) |
| | size | The size of the 1x LAC encapsulated PDU(s) |
| | CSTP-Data.Indication | |
| Type | Indication | |
| Direction | From the CSTP layer to the 1x LAC layer | |
| Action | To deliver the received 1x LAC encapsulated PDU(s) to the 1x LAC layer | |
| Parameters | logical_channel | The logical channel type, e.g. a dsch or a csch |
| | data | The 1x LAC encapsulated PDU(s) |
| | size | The size of the 1x LAC encapsulated PDU(s) |
| | CSTP-SDUReady.Request | |
| Type | Request | |
| Direction | From the 1x LAC layer to the CSTP layer | |
| Action | To indicate that there is a 1x LAC encapsulated PDU ready for transmission | |
| Parameters | msg_tag | The message type defined in the Message Control and Status Block (MCSB) |
| | size | The size of the 1x LAC encapsulated PDU |
| | CSTP-Availability.Indication | |
| Type | Indication | |
| Direction | From the CSTP layer to the 1x LAC layer | |
| Action | To indicate that the 1x LAC encapsulated PDU can be transferred | |
| Parameters | size | The size of the 1x LAC encapsulated PDU |
| | CSTP-Failure.Indication | |
| Type | Indication | |
| Direction | From the CSTP layer to the 1x LAC layer | |
| Action | To indicate the 1x LAC layer that a certain event preventing a successful transmission has occurred | |
| Parameters | reason | The reason of transmission failure |

TABLE 2

3G1xServices message

| Field | Length (bits) |
|---|---|
| MessageID | 8 |
| MessageSequence | 6 |
| 3G1xLogicalChannel | 1 |
| ProtocolRevision | 8 |
| PDULength | 16 |
| PDU | PDULength *8 |

As shown in Table 2, the "3G1xLogicalChannel" field indicates the logical channel type used by the 3G1xServices message, e.g. a CSCH (common signaling channel) is used when the value of the "3G1xLogicalChannel" field is 0, and a DSCH (dedicated signaling channel) is used when the value of the "3G1xLogicalChannel" field is 1. The "ProtocolRevision" field indicates a protocol level used by the 3G1xServices message. The "PDU" field stores the 1x LAC encapsulated PDU.

In addition to the modifications to the 1x LAC layer as described above, corresponding modifications are made to the interface S102 in IWS 111 and the MME 121. In the A21-1x Air Interface Signaling message, the "1x LAC encapsulated PDU" information element (IE) is modified to a "CSTP PDU" IE, and the "AckRequired" and "3G1xLogicalChannel" fields in the "A21 1x Message Transmission Control" IE are omitted. The message format of the A21-Ack message remains the same as specified in the 3GPP TS 23.272 specification, while the operational procedure of the A21-Ack message is modified to. The A21-Ack message is transmitted between the interface S102 in the IWS 111 and the MME 121 to acknowledge the reception of the A21-1x Air Interface Signaling message.

In the invention, an acknowledgement mechanism may be implemented for the message transmissions from the CSTP layer, to ensure the delivery of the transmitted messages. In a case where a transmitted message is not received at a receiving end, the acknowledgement mechanism may enable the retransmission of the transmitted but missed message. Since the IWS 111 is responsible for the transformation between the air interface messages and the A1 interface messages, the processing related to the 1x LAC layer and the 1x layer 3 is easy for the 1x LAC layer. Thus, in one embodiment, the acknowledgement mechanism may be performed in the 1x LAC layer of the IWS 111. The acknowledgement mechanism is further described as follows. At first, the Automatic Repeat-reQuest (ARQ) sublayer in the 1x LAC layer sets the "ACK_REQ" and "VALID_ACK" fields in the PDU and transfers the 1x LAC encapsulated PDU. When the LAC layer receives the 1x LAC encapsulated PDU from the 1x layer 3, the ARQ sublayer performs the acknowledgement mechanism according to the "ACK_REQ" and "VALID_ACK" fields indicated in the 1x LAC encapsulated PDU. In a case where the value of the "ACK_REQ" filed is set to 1, the ARQ sublayer in the 1x LAC layer performs the acknowledgement mechanism as described above, i.e. the 1x LAC encapsulated PDU is transferred to the CSTP layer to be packaged in a 3G1xServices message and further transmitted to another entity at the receiving end, and at the receiving end, the another entity retrieves the 1x LAC encapsulated PDU from the 3G1xServices message and transfers the 1x LAC encapsulated PDU to the 1x LAC layer, wherein the ARQ sublayer replies an acknowledgement message to the ARQ sublayer at the transmitting end to acknowledge the reception of the 1x LAC encapsulated PDU. Thus, a peer layer acknowledgement mechanism is established in the 1x LAC layers at both the transmitting and receiving ends, so as to concurrently ensure the delivery of the 3G1xServices message.

In another embodiment, the acknowledgement mechanism may be performed in the CSTP layer. In order to implement the acknowledgement mechanism in the CSTP layer, a 3G1xServicesAck message is additionally defined so that the transmitted 3G1xServices message is assured of being successfully received. In response to the addition of the 3G1xServicesAck message, the ARQ sublayer in the 1x LAC layer is required to always set the values of the "ACK_REQ" and "VALID_ACK" fileds to 0. Furthermore, a new parameter "delivery_mode" may be added to the CSTP-Data.Request and CSTP-Data.Indication, to indicate if the acknowledgement mechanism should be activated.

It is noted that the principle of the CSTP layer of the invention is to provide a signaling tunnel between mobile service networks of different specifications. Thus, the CSTP layer of the invention may be applied to a Single Radio Voice Call Continuity (SRVCC) architecture, in addition to the CSFB architecture. The difference between the application of the CSTP layer to the CSFB architecture and the SRVCC architecture is that the signaling tunnel used in the CSFB architecture is a shared signaling tunnel while the signaling tunnel used in the SRVCC architecture is a dedicated signaling tunnel. Those skilled in the art should appreciate that the CSTP layer of the invention is not limited to the interconnection between a CDMA-2000 system and an LTE system. The CSTP layer of the invention may be also used for the interconnection between a CDMA-2000 system and other mobile communications system, such as a WiMAX system, a WiFi system, an HRPD system, or an EV-DO system.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A user equipment connected to a first mobile service network providing packet-switched domain services, comprising:
    a first communications protocol module for communicating with the first mobile service network;
    a circuit switch tunneling control module for establishing a circuit service tunnel, via the first mobile service network, from the user equipment to an interworking node of a second mobile service network providing circuit-switched domain services, wherein the interworking node is connecting the second mobile service network to the first mobile service network; and
    a circuit switch tunneling data module for transmitting a circuit service tunneling message for the second mobile service network via the circuit service tunnel,
    wherein the circuit switch tunneling control module further receives a measurement request from the second mobile service network, performs a pilot measurement on the first mobile service network, and transmits a measurement result obtained from the pilot measurement to the second mobile service network.

2. The user equipment of claim 1, wherein the circuit service tunneling message comprises any combination of the following:

a logical channel indication information indicating that a shared signaling channel or a dedicated signaling channel is being used to transmit the circuit service tunneling message; and a protocol revision information indicating that a protocol level is being used for the circuit-service tunneling message.

3. The user equipment of claim 1, wherein the circuit service tunneling message carries data from a Link Access Control layer providing a layer-to-layer message acknowledgment mechanism to ensure the delivery of the circuit service tunneling message.

4. The user equipment of claim 1, further comprising a second communications protocol module for communicating with the second mobile service network.

5. The user equipment of claim 4, wherein the circuit switch tunneling control module is further configured to:

receive a system information block from the first mobile service network via the first communications protocol module;

transmit a plurality of registration parameters indicated in the system information block to the second communications protocol module;

transmit a parameter request to the first mobile service network via the first communications protocol module in response to a request from the second communications protocol module;

receive a parameter response from the first mobile service network via the first communications protocol module; and transmit a plurality of configuration parameters indicated in the parameter response to the second mobile service network.

6. The user equipment of claim 1, wherein the circuit switch tunneling data module further receives another circuit service tunneling message from the second mobile service network.

7. The user equipment of claim 1, wherein the second mobile service network is one of the following:
 a Code-Division Multiple-Access 2000 system;
 a Code-Division Multiple-Access 1x Evolution-Data Optimized system;
 a Worldwide Interoperability for Microwave Access system; and
 a High Rate Packed Data system.

8. The user equipment of claim 1, wherein the second mobile service network further transmits a circuit service tunneling acknowledgement message to inform the user equipment that the circuit service tunneling message has been received when receiving the circuit-service tunneling message.

9. The user equipment of claim 1, wherein the circuit switch tunneling control module enters an inactive state in response to initializing the user equipment or the first communications protocol module, and enters an active state in response to the user equipment connecting to the first mobile service network.

10. A circuit service tunneling method for a user equipment connected to a first mobile service network providing packet-switched domain services, comprising:

communicating with the first mobile service network via a first communications protocol module;

establishing a circuit service tunnel, via the first mobile service network, from the user equipment to an interworking node of a second mobile service network providing circuit-switched domain services, wherein the interworking node is connecting the second mobile service network to the first mobile service network;

transmitting a circuit service tunneling message for the second mobile service network via the circuit service tunnel;

performing a pilot measurement on the first mobile service network when receiving a measurement request from the second mobile service network; and transmitting a measurement result obtained from the pilot measurement to the second mobile service network.

11. The circuit service tunneling method of claim 10, wherein the circuit service tunneling message comprises any combination of the following:

a logical channel indication information indicating that a shared signaling channel or a dedicated signaling channel is being used to transmit the circuit service tunneling message; and a protocol revision information indicating that a protocol level is being used for the circuit-service tunneling message.

12. The circuit service tunneling method of claim 10, wherein the circuit service tunneling message carries data from a Link Access Control layer providing a layer-to-layer message acknowledgment mechanism to ensure the delivery of the circuit service tunneling message.

13. The circuit service tunneling method of claim 10, further comprising communicating with the second mobile service network via a second communications protocol module.

14. The circuit service tunneling method of claim 13, further comprising:

receiving a system information block from the first mobile service network via the first communications protocol module;

transmitting a plurality of registration parameters indicated in the system information block to the second communications protocol module;

transmitting a parameter request to the first mobile service network via the first communications protocol module in response to a request from the second communications protocol module;

receiving a parameter response from the first mobile service network via the first communications protocol module; and transmitting a plurality of configuration parameters indicated in the parameter response to the second mobile service network.

15. The circuit service tunneling method of claim 10, further comprising receiving another circuit service tunneling message from the second mobile service network.

16. The circuit service tunneling method of claim 11, wherein the second mobile service network is one of the following:
 a Code-Division Multiple-Access 2000 system;
 a Code-Division Multiple-Access 1x Evolution-Data Optimized system;
 a Worldwide Interoperability for Microwave Access system; and
 a High Rate Packed Data system.

17. The circuit service tunneling method of claim 10, wherein the second mobile service network further transmits a circuit service tunneling acknowledgement message to inform the user equipment that the circuit service tunneling message has been received when receiving the circuit-service tunneling message.

18. The circuit service tunneling method of claim 10, further comprising activating the establishing of the circuit service tunnel in response to initializing the user equipment or the first communications protocol module, and activating the establishing of the circuit service tunnel in response to the user equipment connecting to the first mobile service network.

19. A user equipment connected to a first mobile service network providing packet-switched domain services, comprising:
- a first communications protocol module for communicating with the first mobile service network;
- a circuit switch tunneling control module for establishing a circuit service tunnel between the first mobile service network and a second mobile service network providing circuit-switched domain services, wherein the circuit service tunnel is established by the user equipment; and
- a circuit switch tunneling data module for transmitting a circuit service tunneling message from the first communications protocol module to the second mobile service network via the circuit service tunnel,
- wherein the circuit switch tunneling control module further receives a measurement request from the second mobile service network, performs a pilot measurement on the first mobile service network, and transmits a measurement result obtained from the pilot measurement to the second mobile service network.

20. A circuit service tunneling method for a user equipment connected to a first mobile service network providing packet-switched domain services, comprising:
- communicating with the first mobile service network via a first communications protocol module;
- establishing a circuit service tunnel between the first mobile service network and a second mobile service network providing circuit-switched domain services, wherein the circuit service tunnel is established by the user equipment;
- transmitting a circuit service tunneling message from the first communications protocol module to the second mobile service network via the circuit service tunnel;
- performing a pilot measurement on the first mobile service network when receiving a measurement request from the second mobile service network; and
- transmitting a measurement result obtained from the pilot measurement to the second mobile service network.

* * * * *